US008838708B1

(12) United States Patent
Rhodes et al.

(10) Patent No.: US 8,838,708 B1
(45) Date of Patent: Sep. 16, 2014

(54) METHODS AND APPARATUS FOR ELECTRONIC COMMUNICATION FILTERING

(75) Inventors: Bradley Rhodes, Alameda, CA (US); Thad Starner, Mountain View, CA (US); Cliff L. Biffle, Berkeley, CA (US)

(73) Assignee: Google Inc., Mountain View, CA (US)

( * ) Notice: Subject to any disclaimer, the term of this patent is extended or adjusted under 35 U.S.C. 154(b) by 165 days.

(21) Appl. No.: 13/212,441

(22) Filed: Aug. 18, 2011

(51) Int. Cl.
*G06F 15/16* (2006.01)

(52) U.S. Cl.
USPC ............................ 709/206; 709/221; 705/1.1

(58) Field of Classification Search
USPC ................................... 709/221, 206; 705/1.1
See application file for complete search history.

(56) References Cited

U.S. PATENT DOCUMENTS

| | | | |
|---|---|---|---|
| 6,236,768 B1 | 5/2001 | Rhodes et al. | |
| 7,192,136 B2 | 3/2007 | Howell et al. | |
| 7,255,437 B2 | 8/2007 | Howell et al. | |
| 7,363,590 B2 | 4/2008 | Kerr et al. | |
| 7,380,936 B2 | 6/2008 | Howell et al. | |
| 7,401,918 B2 | 7/2008 | Howell et al. | |
| 7,438,410 B1 | 10/2008 | Howell et al. | |
| 7,481,531 B2 | 1/2009 | Howell et al. | |
| 7,500,746 B1 | 3/2009 | Howell et al. | |
| 7,500,747 B2 | 3/2009 | Howell et al. | |
| 7,543,934 B2 | 6/2009 | Howell et al. | |
| 7,581,833 B2 | 9/2009 | Howell et al. | |
| 7,621,634 B2 | 11/2009 | Howell et al. | |
| 7,634,732 B1 | 12/2009 | Blagsvedt et al. | |
| 7,677,723 B2 | 3/2010 | Howell et al. | |
| 7,760,898 B2 | 7/2010 | Howell et al. | |
| 7,771,046 B2 | 8/2010 | Howell et al. | |
| 7,792,552 B2 | 9/2010 | Thomas et al. | |
| 7,806,525 B2 | 10/2010 | Howell et al. | |
| 7,922,321 B2 | 4/2011 | Howell et al. | |
| 8,109,629 B2 | 2/2012 | Howell et al. | |
| 2002/0144136 A1 | 10/2002 | Stornetta, Jr. et al. | |
| 2004/0095378 A1 | 5/2004 | Vigue et al. | |
| 2005/0038687 A1* | 2/2005 | Galdes | 705/9 |
| 2009/0149203 A1* | 6/2009 | Backholm et al. | 455/466 |

OTHER PUBLICATIONS

K.F. Eustice et al., "A Universal Information Appliance," IBM Systems Journal, vol. 38, No. 4., 1999, pp. 575-601.
M. Lamming et al.,"Forget-Me-Not: Intimate Computing in Support of Human Memory," Friend21: International Symposium on Next Generation Human Interface, Meguro Gajoen, Japan (1994), pp. 125-128.
N. Miura et al., "Aware-Mail: an Event-driven Mail System for Wearable Computing Environments," Proceedings of the 24th International Conference on Distributed Computing Systems Workshops, Mar. 2004, pp. 402-407.
B. Rhodes et al., "Just-in-time information retrieval agents", IBM Systems Journal special issue on the MIT Media Laboratory, vol. 39, Nos. 3 and 4, 2000, pp. 685-704.

* cited by examiner

*Primary Examiner* — David Lazaro
*Assistant Examiner* — Marie Georges Henry
(74) *Attorney, Agent, or Firm* — McDonnell Boehnen Hulbert & Berghoff LLP

(57) ABSTRACT

Disclosed are systems, methods, and devices for displaying one or more electronic communications associated with a meeting. A request to filter a plurality of electronic communications based on an identifier of a participant of the meeting is received at a computing device. The computing device filters the plurality of electronic communications, based at least on the identifier of the participant, to obtain at least one filtered electronic communication. The computing device generates a display of the at least one filtered electronic communication.

18 Claims, 9 Drawing Sheets

| EC Selector Bar 410 | E-mail Field Bar 420 | | | ECUI 400 |
|---|---|---|---|---|
| Mail Meetings Contacts Tasks more... | | | | Help |
| | From | To | Subject | Date |
| E-mail Selector 430 — Incoming Sent Mail Deleted Important Unread | Abe T. | WHOMP | Meeting on Thursday – room? | 1:16 PM Today — 440a |
| | Cabe Z. | Abe T., ... | New CEO in town? | 11:05 AM Today — 440b |
| | Babe O. | WHOMP | Updated Document for WHOM | 11:02 AM Today — 440c |
| | Eve L. | CHOMP | CHOMP Friday in Room 222 | 10:06 AM Today — 440d |
| | Dave L. | CHOMP | CHOMP Friday Session | 9:09 AM Today |
| | Babe O. | Me | Re: Fantasy Baseball Draft | 2:02 AM Today |
| | Babe O. | WHOMP | Document for WHOMP | 1:59 AM Today |
| | Cabe Z. | Me | Donuts on Thu? | 1:17 PM Yesterday — 440e |
| Meeting Filter Button 450 — [MEETING FILTER] | Fave L. | Me | How is Feature X for CHOMP? | 11:23 AM Yesterday |
| | Barry C. | Me | Fantasy Baseball Draft | 9:22 AM Yesterday |
| | Lead R. | WHOMP | WHOMP Status Meeting | 10:00 AM Monday |
| | Spouse | Me | Re: Movie night? | 6:16 PM Sat. |
| | Doug R. | FlickFans | Re: Movie night? | 6:14 PM Sat. |
| | Pat B. | FlickFans | Re: Movie night? | 6:11 PM Sat. |
| | Movie Maven | FlickFans | Movie night? | 5:55 PM Sat. — 440f |
| | Spouse | Me | When are you coming home? | 8:15 PM Fri. |
| | Abe T. | Me | Out of Office message | 5:15 PM Fri. |
| | Abe T. | Me | Build problem for CHOMP | 5:03 PM Fri. |
| | Cabe Z. | Me | Out of Office message | 5:03 PM Fri. |
| | Cabe Z. | WHOMP | WHOMP Meeting Notes | 4:59 PM Fri. |
| | Cabe Z. | WHOMP | Your WHOMP Action Items | 4:58 PM Fri. |
| | Dave L. | CHOMP | Your CHOMP Action Items | 4:56 PM Fri. |
| | Dave L. | CHOMP | CHOMP Meeting Notes | 4:52 PM Fri. |
| | Lead R. | Me | Out of Office message | 3:02 PM Fri. |
| | Lead R. | WHOMP | Get Al's to Cabe by 4 | 3:00 PM Fri. |
| | Lead R. | CHOMP | Get Al's to Cabe by 4 | 2:59 PM Fri. — 440g |

E-mail Display 440

FIG. 4

| | |
|---|---|
| Meeting 610 for Scenario 600:<br>Time:     1 PM Thursday<br>Host:      A<br>Invitees:  B, C, D<br>Topic:    WHOMP Status Meeting<br>Agenda:  B, C' and D's status<br>Documents: Status Report, Action Items | Electronic Communications 612 for Scenario 600:<br>612a  From A: to B, C<br>612b  From B: to A, D<br>612c  From C: to A, B, D<br>612d  From D: to E<br>612e  From D: to A, B, C<br>612f   From A: to A, B, D<br>612g  From E: to A, D |
| Sender Filter 620<br>If (sender = meeting participant)<br>    retain as filtered communication;<br>Else<br>    discard communication;<br>End If | Sender-Filtered Communications 622:<br>612a  From A: to B, C<br>612b  From B: to A, D<br>612c  From C: to A, B, D<br>612d  From D: to E<br>612e  From D: to A, B, C<br>612f   From A: to A, B, D |
| Receiver(s) Filter 630:<br>For each receiver of communication<br>    If (receiver = meeting participant)<br>        retain as filtered communication;<br>        break;<br>    End If<br>End For<br>Discard communication; | Receiver(s)-Filtered Communications 632:<br>612a  From A: to B, C<br>612b  From B: to A, D<br>612c  From C: to A, B, D<br>612e  From D: to A, B, C<br>612f   From A: to A, B, D<br>612g  From E: to A, D |
| Sender + Receiver Filter 640:<br>Apply Sender Filter<br>For each retained communication<br>    Apply Receiver(s) Filter<br>End For | Sender + Receiver-Filtered Communications 642:<br>612a  From A: to B, C<br>612b  From B: to A, D<br>612c  From C: to A, B, D<br>612e  From D: to A, B, C<br>612f   From A: to A, B, D |
| Loop Filter 650:<br>If (set(sender + receivers of communication) =<br>   set(participants))<br>    retain as filtered communication;<br>Else<br>    discard communication;<br>End If | Loop-Filtered Communications 652:<br>612c  From C: to A, B, D<br>612d  From D: to A, B, C |

FIG. 6

METHODS AND APPARATUS FOR ELECTRONIC COMMUNICATION FILTERING

BACKGROUND

Unless otherwise indicated herein, the materials described in this section are not prior art to the claims in this application and are not admitted to be prior art by inclusion in this section.

Software and/or hardware applications can be used to display, generate, and communicate electronic communications, such as electronic mail, short messages, blog entries, web pages, etc. Some of these software applications can receive a number of electronic communications and can display the received communications; for example, sorted by a sender's name or time of reception.

Additional software and/or hardware applications can be used to manage meetings and generate corresponding meeting notices. A meeting notice is typically generated by (or on behalf of) one or more hosts and informs one or more invitees that a meeting is scheduled at a given time. In some cases, the meeting notice can include a meeting time and/or additional information, such as document(s) associated with the meeting.

SUMMARY

In a first aspect, a method is provided. A request to filter a plurality of electronic communications based on an identifier of a participant of a meeting is received at a computing device. The plurality of electronic communications are filtered by the computing device, based at least on the identifier of the participant, to obtain at least one filtered electronic communication. A display of the at least one filtered electronic communication is generated by the computing device.

In a second aspect, a computing device is provided. The computing device includes a processor and memory. The memory has one or more instructions that, upon execution by the processor, cause the computing device to perform functions. The functions include: (i) receiving a request to filter a plurality of electronic communications based on an identifier of a participant of a meeting, (ii) filtering the plurality of electronic communications based at least on the identifier of the participant to obtain at least one filtered electronic communication, and (iii) generating a display of the at least one filtered electronic communication.

In a third aspect, an article of manufacture is provided. The article of manufacture includes a computer-readable storage medium having instructions stored thereon that, in response to execution by a processor, cause the processor to perform functions. The instructions include: (i) instructions to receive a request to filter a plurality of electronic communications based on an identifier of a participant of a meeting, (ii) instructions to filter the plurality of electronic communications based at least on the identifier of the participant to obtain at least one filtered electronic communication, and (iii) instructions to generate a display of the at least one filtered electronic communication.

BRIEF DESCRIPTION OF THE DRAWINGS

FIG. 4 is a screen view of an electronic communication user interface, in accordance with an example embodiment.

FIG. 6 illustrates an example scenario of filtering an example plurality of electronic communications based on an example meeting using a number of example filters, in accordance with an example embodiment.

DETAILED DESCRIPTION

Overview

Figure 1:
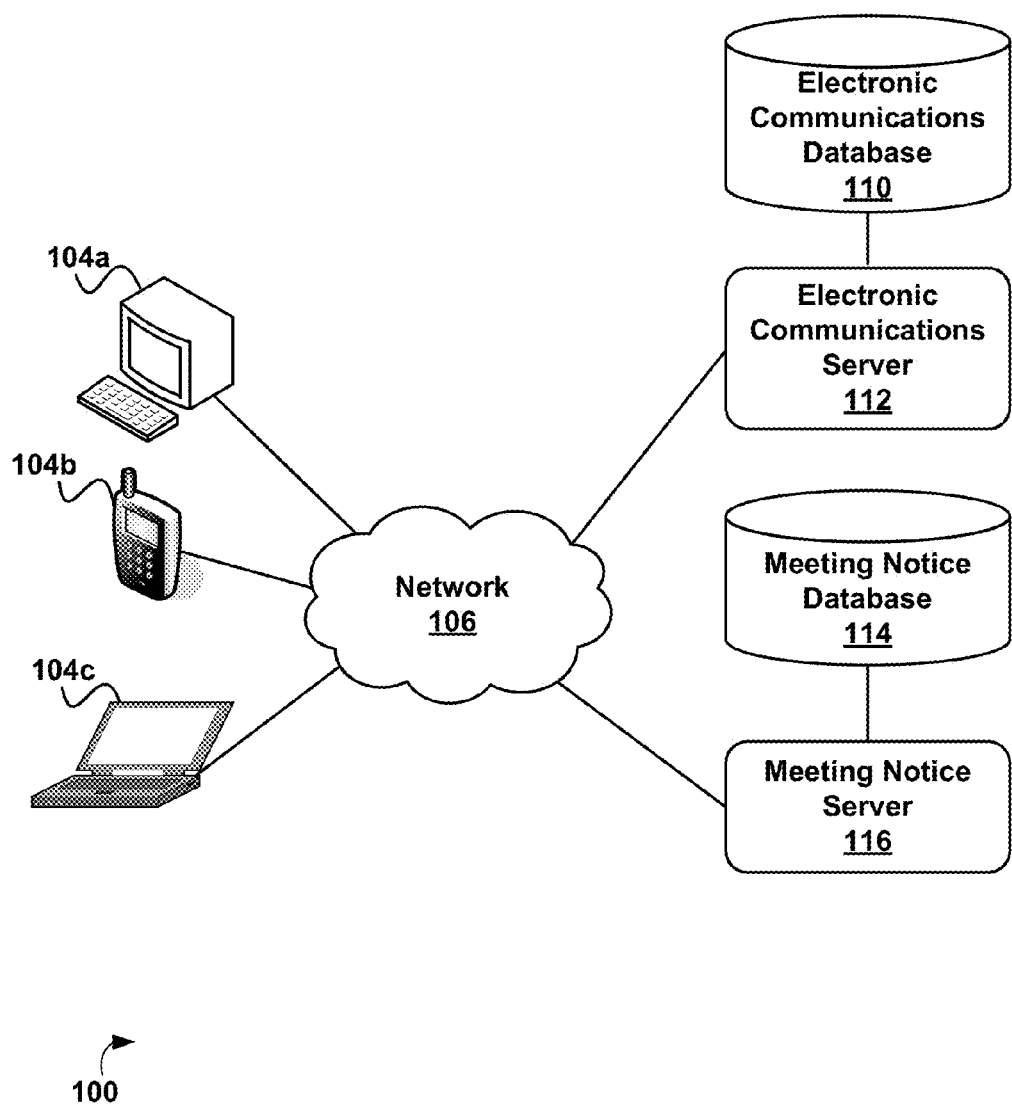
FIG. 1 is a schematic diagram illustrating a distributed computing architecture in accordance with an example embodiment.

People have meetings every day in a number of different venues and forms. For example, people worldwide daily have face-to-face meetings, telephone conferences, public lectures, classes, and discussions, Web-based and other electronic meetings, and various other kinds of meetings. Typically, meetings occur at a given date and time, have at least one topic for discussion, and are established by a "host" to be attended by one or more "invitees." The host and invitee(s) of the meeting can be collectively called "participants."

Meetings can be arranged with the aid of electronic meeting notices. That is, one or more hosts for a meeting can send out an electronic meeting notice (a.k.a. invitations) to one or more invitees of the meeting. The electronic meeting notice can include a given (or proposed) date and/or time for the meeting, one or more topics for discussion, a list of one or more hosts, a list of one or more invitees, and other information, such as an agenda and/or links or copies of documents associated with the meeting.

For example, if Alice wants to have a discussion with Bob and Carla about an upcoming trip to Thailand, Alice can format and send an electronic meeting notice to invite Bob and Carla to the meeting, with information about the meeting, such as the topic (e.g., "Thai trip"), time/place information, and perhaps an agenda and/or some related documents (e.g., example itineraries, information about Thailand, etc.). When Bob and Carla each receive a copy of the electronic meeting notice, each of them can decide whether or not to attend the meeting. In this example, Alice is the "host" of the meeting and Bob and Carla are "invitees" of the meeting. While it is possible that a meeting can have multiple hosts, it is assumed that all meetings have only one host to simplify the remainder of the discussion herein.

In some cases, electronic communications, such as electronic mail, blog postings, short messages, and other electronic communications, about the meeting are exchanged before, after, and sometimes during the meeting. For example, after receiving the meeting notice from Alice, Bob can send an electronic mail message to Carla asking her about the meeting. The term "e-mail" is used herein interchangeably with the term "electronic mail message."

E-mails and other electronic communications can be "filtered" or selected, based on the electronic meeting notice. For example, a computer application can have a button (virtual or literal) to filter a user's electronic communications, such as email, so as to show the user only the electronic communications with persons associated with the meeting. For example, Carla can use a meeting filter to select the meeting about the That trip and then display only e-mails that are either to or from Alice and Bob. The identities of the other persons, Alice and Bob, can be taken from the meeting notice and/or from other data stored about the other persons; e.g., Carla's contact information for Alice and Bob. Meeting-based filters for electronic communications can help in reviewing electronic communications relevant to a meeting to focus and prepare for the meeting.

In some scenarios, an invitee can generate his or her own electronic meeting notices. For example, suppose Rick and Scott have a telephone call where they arrange to have a meeting in a week's time. Rick can use a software application, such as an electronic calendar, to add a calendar entry with time and date information for the upcoming meeting, a location or telephone number to reach Scott, and any other information Rick wishes to keep about the meeting, such as a topic and/or associated document(s). In particular scenarios, Rick can send his calendar entry to Scott, so that both Rick and Scott can use the calendar entry as an electronic meeting notice. Similarly, Scott can generate the calendar entry and send it to Rick for use as an electronic meeting notice. In other scenarios, Rick can decide not to send his calendar entry to Scott, so that the calendar entry acts as an electronic meeting notice for Rick but not Scott.

Electronic communications can be filtered based on one or more filtering rules. These filtering rules can include: show only "n" other emails (n>=1) from the meeting host and invitees, show only communications sent or received from the other person(s) within the past "n" time units (e.g., days); and/or show only communications sent and/or received from the other person(s).

A more complex "closed loop" filter of electronic communications can be utilized as well. Continuing the That Trip example, if an e-mail with a subject of "Trip Dates" is addressed from Bob to Alice and Carla, the e-mail can be considered to form a closed loop through the host and all invitees, Alice, Bob, and Carla. A technique to determine if a closed-loop filter is satisfied is to compare a meeting set including all participants of a meeting with an electronic-communications set including a sender and receivers of a given electronic communication. The closed-loop filter is satisfied for the given electronic communication and the meeting when the meeting set equals the electronic-communication set.

However, if Alice sends an e-mail to Carla alone with a topic of "More Trip Stuff", then not all meeting participants are part of the e-mail. In this example, the "More Trip Stuff" e-mail can be filtered out by the closed-loop filter. In some embodiments, the closed loop filter can be used for e-mail that does not include up to N (N≥1) participants and/or also includes up to M (M≥1) non-participants.

The filtering rules can include rules for showing materials in addition to, or instead of, electronic communications. Examples of these other materials include documents related to the meeting, contact information for the other person(s), search results for the other person(s), information from social networking sites, such as LinkedIn or Facebook, pertaining to the other person(s), and other kinds of information.

Distributed Computing Architecture

FIG. 1 depicts a distributed computing architecture 100 in accordance with an example embodiment. In FIG. 1, server devices 112 and 116 are each configured to communicate, via a network 106, with client devices 104a, 104b, and 104c. Electronic communications server 112 has access to electronic communications database 110, and meeting notice server 116 has access to meeting notice database 114. In some embodiments, the functionality of server devices 112 and 116 can be combined in one device. In other embodiments, the functionality of databases 110 and 114 can be combined in one database. In still other embodiments, the functionality of all of 110, 112, 114, and 116 can be combined into one device.

Network 106 can include a LAN, a wide area network (WAN), a corporate intranet, the public Internet, one or more wireless networks, or any other type of network configured to provide a communications path between networked computing devices. The network 106 can also correspond to a combination of one or more LANs, WANs, wireless networks, corporate intranets, and/or the public Internet.

Although FIG. 1 only shows three client devices, distributed computing architecture 100 can serve tens, hundreds, or thousands of client devices. Moreover, client devices 104a, 104b, and 104c (or any additional client devices) can be any sort of computing device, such as a laptop computer, desktop computer, network terminal, wireless communication device (e.g., a cell phone or smart phone), wearable computing devices, etc. In some embodiments, client devices 104a, 104b, and 104c can be dedicated solely for electronic communications. In other embodiments, client devices 104a, 104b, and 104c can be general purpose computers that are configured to perform a number of tasks and need not be dedicated to electronic communications.

Computing Device Architecture

Figure 2A:
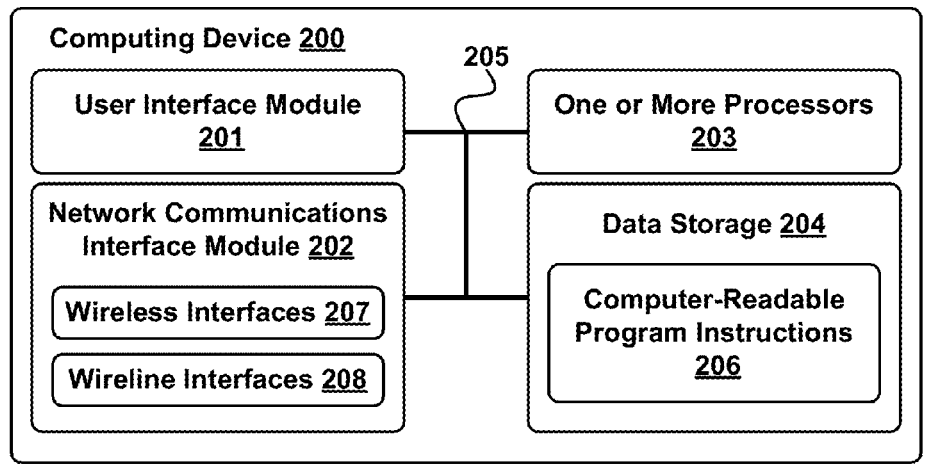
FIG. 2A is a block diagram of a computing device, in accordance with example embodiments.

FIG. 2A is a block diagram of a computing device (e.g., system) 200 in accordance with an example embodiment. In particular, computing device 200 shown in FIG. 2A can be configured to perform one or more functions of one or more of client devices 104a, 104b, and 104c, electronic communications database 110, electronic communications server 112, meeting notice database 114, and/or meeting notice server 116. Computing device 200 can include user interface module 201, network-communication interface module 202, one or more processors 203, and data storage 204, all of which can be linked together via a system bus, network, or other connection mechanism 205.

In some embodiments, computing device 200 is configured to be worn; i.e., computing device 200 is a wearable computing device. For example, some or all of the components of computing device can be fashioned as a pair of eyeglasses, a wearable portable device, or another wearable form.

User interface module 201 can be operable to send data to and/or receive data from external user input/output devices. For example, user interface module 201 can be configured to send and/or receive data to and/or from user input devices such as a keyboard, a keypad, a touch screen, a computer mouse, a track ball, a joystick, a camera, a voice recognition module, and/or other similar devices. User interface module 201 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 201 can also be configured to generate audible output(s), such as a speaker, speaker jack, audio output port, audio output device, earphones, and/or other similar devices.

Network-communications interface module 202 can include one or more wireless interfaces 207 and/or one or more wireline interfaces 208 that are configurable to communicate via a network, such as network 106 shown in FIG. 1. Wireless interfaces 207 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 208 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 202 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 203 can include one or more general purpose processors and/or one or more special purpose processors (e.g., digital signal processors, application specific integrated circuits, etc.). Processors 203 can be configured to execute computer-readable program instructions 206 that are contained in the data storage 204 and/or other instructions as described herein.

Data storage 204 can include one or more computer-readable storage media that can be read and/or accessed by at least one of processors 203. The one or more computer-readable storage media can include volatile and/or non-volatile storage components, such as optical, magnetic, organic or other memory or disc storage, which can be integrated in whole or in part with at least one of processors 203. In some embodiments, data storage 204 can be implemented using a single physical device (e.g., one optical, magnetic, organic or other memory or disc storage unit), while in other embodiments, data storage 204 can be implemented using two or more physical devices.

Data storage 204 can include computer-readable program instructions 206 and perhaps additional data. In some embodiments, the data storage 204 can additionally include storage required to perform at least part of the herein-described methods and techniques and/or at least part of the functionality of the herein-described devices and networks.

Cloud-Based Servers

Figure 2B:
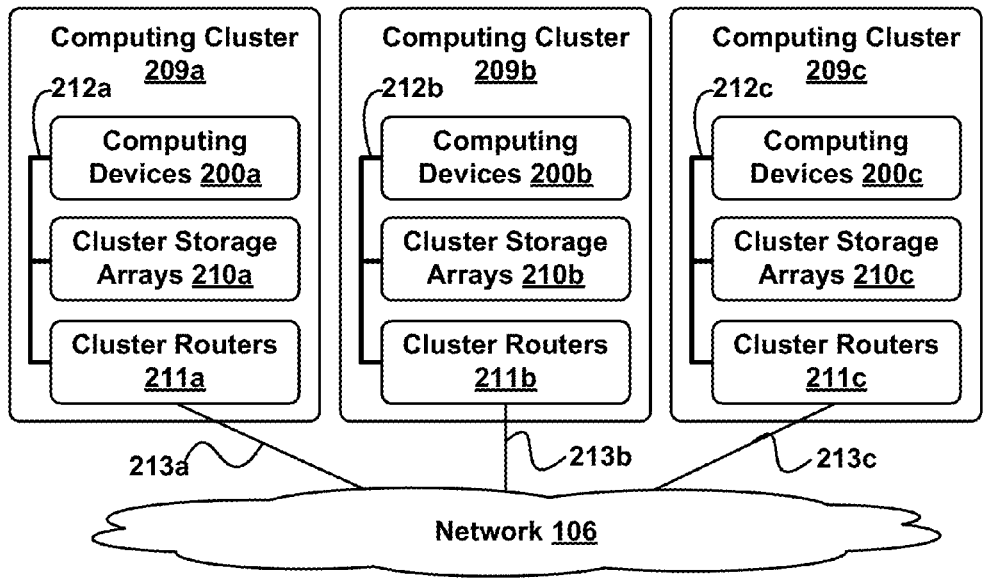
FIG. 2B is a schematic diagram illustrating network of computing clusters arranged as a cloud-based server system in accordance with an example embodiment.

FIG. 2B depicts a network 106 of computing clusters 209a, 209b, 209c arranged as a cloud-based server system in accordance with an example embodiment. Electronic communications database 110, electronic communications server 112, meeting notice database 114 and/or meeting notice server 116 can be cloud-based devices that store program logic and/or data of cloud-based applications and/or services. In some embodiments, electronic communications database 110, electronic communications server 112, meeting notice database 114 and meeting notice server 116 can be a single computing device residing in a single computing center. In other embodiments, electronic communications database 110, electronic communications server 112, meeting notice database 114 and meeting notice server 116 can include multiple computing devices in a single computing center, or even multiple computing devices located in multiple computing centers located in diverse geographic locations. For example, FIG. 1 depicts each of electronic communications server 112 and meeting notice server 116 residing in different physical locations.

In still other embodiments, meeting notice database 106 can include part or all of a calendar database, configured to create, review, update, and delete calendar entries. A calendar entry can specify a beginning time, ending time, a subject/topic, and optionally other recipients than a calendar-entry creator and/or associated text, documents, links, and/or other information for the calendar entry. As such, a calendar entry can be used as a meeting notice. In even other embodiments, e-mails can be used as meeting notices. In these embodiments, e-mail addresses can be extracted from the calendar entries, e-mails, and/or other electronic communications that specify the e-mail group or other reference, and then the e-mail group or other reference can be replaced by the extracted e-mail addresses.

In even other embodiments, meeting notice database 106 can include part or all of a contact database, configured to create, review, update, and delete contact information. Contact information can include one or more contacts that each includes information about communicating with an entity. A contact and/or contact information can include information, such as but not limited to, the entity's name, e-mail address(es) associated with the entity, paper mail address information, telephone number(s) associated with the entity, title/rank information, Uniform Resource Locators (URL) and/or other electronic links, instant messaging information, and/or other information about the entity.

In some embodiments, data and services at electronic communications database 110, electronic communications server 112, meeting notice database 114 and meeting notice server 116 can be encoded as computer readable information stored in tangible computer readable media (or computer readable storage media) and accessible by client devices 104a, 104b, and 104c, and/or other computing devices. In some embodiments, electronic communications database 110 and/or meeting notice database 114 can be a single disk drive or other tangible storage media, or can be implemented on multiple disk drives or other tangible storage media located at one or more diverse geographic locations.

FIG. 2B depicts a cloud-based server system in accordance with an example embodiment. In FIG. 2B, the functions of electronic communications database 110, electronic communications server 112, meeting notice database 114 and meeting notice server 116 can be distributed among three computing clusters 209a, 209b, and 208c. Computing cluster 209a can include one or more computing devices 200a, cluster storage arrays 210a, and cluster routers 211a connected by a local cluster network 212a. Similarly, computing cluster 209b can include one or more computing devices 200b, cluster storage arrays 210b, and cluster routers 211b connected by a local cluster network 212b. Likewise, computing cluster 209c can include one or more computing devices 200c, cluster storage arrays 210c, and cluster routers 211c connected by a local cluster network 212c.

In some embodiments, each of the computing clusters 209a, 209b, and 209c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 209a, for example, computing devices 200a can be configured to perform various computing tasks of electronic communications server 112. In one embodiment, the various functionalities of electronic communications server 112 can be distributed among one or more of computing devices 200a, 200b, and 200c. Computing devices 200b and 200c in computing clusters 209b and 209c can be configured similarly to computing devices 200a in computing cluster 209a. On the other hand, in some embodiments, computing devices 200a, 200b, and 200c can be configured to perform different functions.

In some embodiments, computing tasks and stored data associated with electronic communications database 110, electronic communications server 112, meeting notice database 114 and meeting notice server 116 can be distributed across computing devices 200a, 200b, and 200c based at least in part on the processing requirements of electronic communications database 110, electronic communications server 112, meeting notice database 114 and meeting notice server 116, the processing capabilities of computing devices 200a, 200b, and 200c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 210a, 210b, and 210c of the computing clusters 209a, 209b, and 209c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of electronic communications database 110, electronic communications server 112, meeting notice database 114, and meeting notice server 116 can be distributed across computing devices 200a, 200b, and 200c of computing clusters 209a, 209b, and 209c, various active portions and/or backup portions of these components can be distributed across cluster storage arrays 210a, 210b, and 210c. For example, some cluster storage arrays can be configured to store the data of electronic communications database 110, while other cluster storage arrays can store meeting notice database 114. Additionally, some cluster storage arrays can be configured to store backup versions of data stored in other cluster storage arrays.

The cluster routers 211a, 211b, and 211c in computing clusters 209a, 209b, and 209c can include networking equipment configured to provide internal and external communications for the computing clusters. For example, the cluster routers 211a in computing cluster 209a can include one or more internet switching and routing devices configured to provide (i) local area network communications between the computing devices 200a and the cluster storage arrays 201a via the local cluster network 212a, and (ii) wide area network communications between the computing cluster 209a and the computing clusters 209b and 209c via the wide area network connection 213a to network 106. Cluster routers 211b and 211c can include network equipment similar to the cluster routers 211a, and cluster routers 211b and 211c can perform similar networking functions for computing clusters 209b and 209b that cluster routers 211a perform for computing cluster 209a.

In some embodiments, the configuration of the cluster routers 211a, 211b, and 211c can be based at least in part on the data communication requirements of the computing devices and cluster storage arrays, the data communications capabilities of the network equipment in the cluster routers 211a, 211b, and 211c, the latency and throughput of local networks 212a, 212b, 212c, the latency, throughput, and cost of wide area network links 213a, 213b, and 213c, and/or other factors that can contribute to the cost, speed, fault-tolerance, resiliency, efficiency and/or other design goals of the moderation system architecture.

Electronic Communication Filtering Architecture

Figure 3:
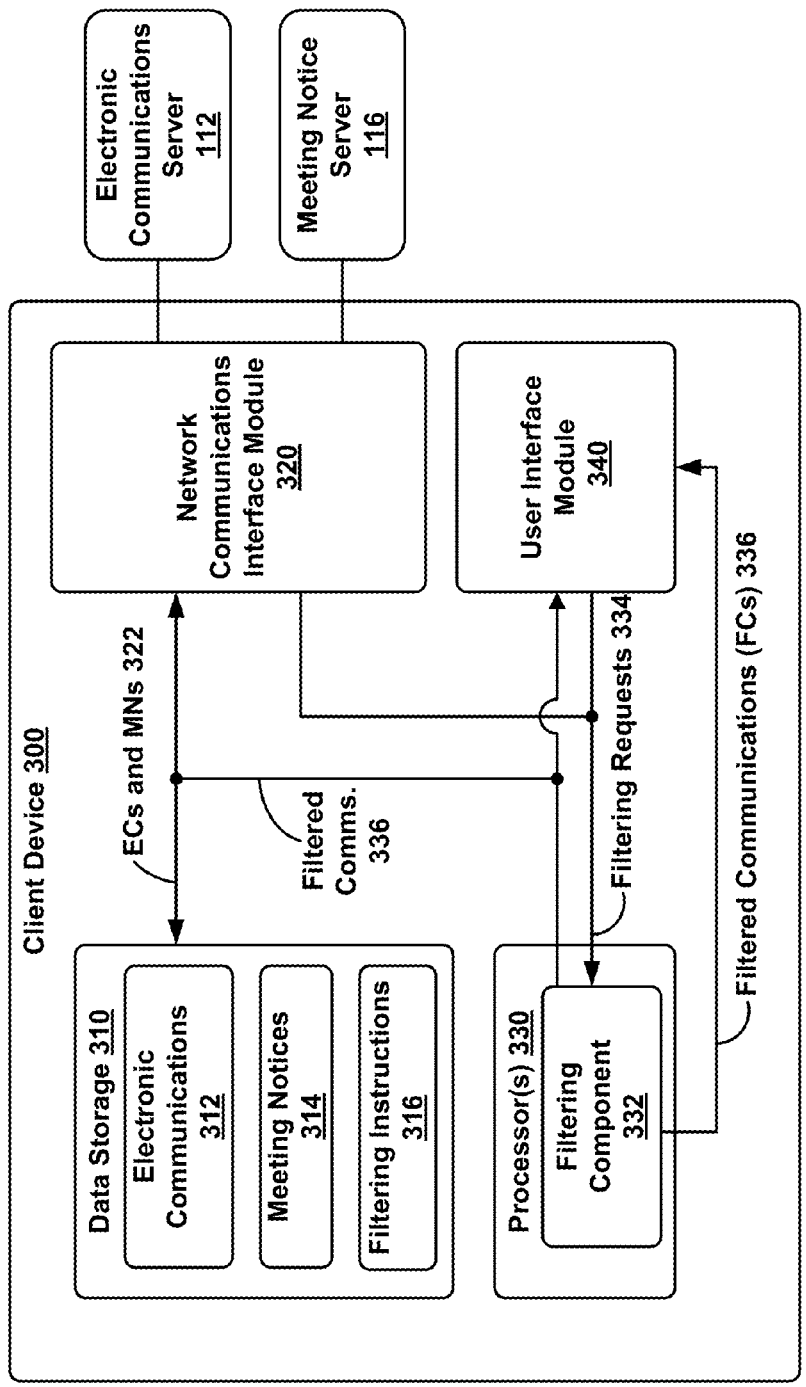
FIG. 3 is a block diagram of a client device configured to filter electronic communications, in accordance with an example embodiment.

FIG. 3 is an example schematic drawing of client device 300 configured for filtering of electronic communications, in accordance with an example embodiment. In some scenarios, one or all of client devices 104a, 104b, and 104c can perform the functionality described herein of client device 300.

FIG. 3 shows client device 300 with data storage 310, network communications interface module 320, processor(s) 330, and user interface module 340. Client device 300 can be implemented using computing device 200. For example, data storage 310 can utilize data storage 204, network communications interface module 320 can utilize network communications interface module 202, processor(s) 330 can utilize one or more processors 203, and user interface module 340 can utilize user interface module 201.

FIG. 3 shows that data storage 310 is configured to store at least electronic communications 312, meeting notices 314, and filtering instructions 316. Electronic communications between client device 300 and electronics communication server 112 can be transmitted via network communications interface module 320 as part of electronic communications (ECs) and meeting notices (MNs) 322 and stored in data storage 322. Similarly, meeting notices can be transmitted between client device 330 and electronics communication server 116 as part of ECs and MNs 322. Electronic communications 312 and meeting notices 314 can be stored and saved by processor(s) 330 via an interconnect, such as connection mechanism 205 (not shown in FIG. 3).

FIG. 3 shows processor(s) 330 configured to provide filtering component 332. Filtering component 332 can be defined by filtering instructions 316 stored in data storage 310. As such, filtering instructions 316 can include one or more instructions that, upon execution by processor(s) 330, causes client device 300 to perform some or all of the functionality described as being performed by filtering component 332.

In particular, filtering component 332 can receive one or more filtering requests 334. In response to a filtering request, filtering component 332 can retrieve electronic communications 312 and meeting notices 314 from data storage 310 and apply one or more filtering rules to electronic communications 312 and meeting notices 314 to generate filtered communications 336. FIG. 3 shows that filtered communications 336 can be output from filtering component 332 for storage in data storage 310, transmission via network communication interface module 320, and/or user-oriented output; e.g., interaction via a graphical user interface, via user interface module 340.

Electronic Communication Filtering User Interfaces

FIG. 4 depicts an example electronic communication user interface (ECUI) 400, in accordance with an example embodiment. Electronic communication user interface 400 includes electronic communication (EC) selector bar 410, e-mail field bar 420, e-mail selector 430, e-mail display region 440, and meeting filter button 450.

Electronic communication selector bar 410 permits selection of various types of electronic communications. As shown in FIG. 4, electronic communication selector bar 410 includes selections for mail, meetings, contacts, tasks, and more items ("more . . . ") with the "Mail" selection shown in bold to indicate that electronic communication user interface 400 is currently selected to display e-mails. In other embodiments, electronic communication selector bar 410 can permit selection of more, fewer, and/or different types of electronic communications than shown in FIG. 4.

E-mail field bar 420 shows fields displayed for each e-mail in e-mail display 440. FIG. 4 shows that e-mail field bar 420 indicates that each e-mail in e-mail display 440 includes From, To, Subject, and Date fields. In some embodiments, clicking on or otherwise selecting a field in e-mail field bar can cause electronic communication user interface 400 to display e-mails in e-mail display 440 sorted by the selected field; e.g., to sort e-mails in e-mail display by date, a user of electronic communication user interface 400 can click on the "Date" field of e-mail field bar 420. In other embodiments, e-mail field bar 420 can show more, fewer, and/or different types of fields for e-mails shown in e-mail display 440 than shown in FIG. 4.

E-mail field bar 420 shows fields displayed for each e-mail in e-mail display 440. FIG. 4 shows that e-mail field bar 420 indicates that each e-mail in e-mail display 440 includes From, To, Subject, and Date fields. In other embodiments, e-mail field bar 420 can show more, fewer, and/or different types of fields for e-mails shown in e-mail display 440 than shown in FIG. 4.

E-mail selector 430 shows various types of e-mails that can be selected for display in e-mail display 440. FIG. 4 shows that e-mail selector 430 indicates incoming, sent mail, deleted, important, or unread e-mails can be selected for display in e-mail display 440. In other embodiments, e-mail selector 430 can show more, fewer, and/or different types of e-mails selectable for display than shown in FIG. 4.

E-mail display 440 is configured to display a number of e-mails. Each e-mail in e-mail display 440 is associated with a sender and one or more receivers. For example, as shown in FIG. 4, e-mail 440a was sent by a sender "Abe T." to a receiver "WHOMP," e-mail 440b was sent from Cabe Z. to Abe T., Babe O., Lead R., and "Me" (not all recipients shown in FIG. 4), e-mail 440c was sent by a sender "Eve L." to a receiver "CHOMP," and e-mail 440d was sent by a sender "Babe O." to a person associated with electronic communication user interface 400, "Me."

In the examples shown in FIGS. 4-8, the person associated with electronic communication user interface 400, "Me" is a member of three e-mail groups: WHOMP, CHOMP, and FlickFans. WHOMP and CHOMP are e-mail groups for all persons associated with the WHOMP and CHOMP work projects, respectively, and FlickFans is an e-mail group for a group of movie buffs. The WHOMP group contains the people: Abe T., Babe O., Cabe Z., Lead R. and "Me". The CHOMP group contains the people: Dave L., Eve L., Faye L., and "Me". FlickFans contains the people: Doug R., Larry B., "Me", Movie Maven, Pat B., and Spouse.

Based in these examples, FIG. 4 shows that e-mail 440a is sent from Abe T. (a member of WHOMP) to the rest of the members of the WHOMP e-mail group, e-mail 440c is sent from Eve L. (a member of CHOMP) to the rest of the members of the CHOMP e-mail group, and e-mail 440f is sent from MovieMaven (a member of FlickFans) to the rest of the members of the FlickFans e-mail group. E-mail 440g is apparently erroneously sent from Lead R., who is not a member of CHOMP, to the CHOMP e-mail group. Also, non-group emails are shown in FIG. 4; e.g., e-mail 440b is sent from Cabe Z. to Abe T., Babe O., Lead R., and "Me"; i.e., the other members of CHOMP, without using the CHOMP e-mail group name, e-mail 440d is sent from Babe O. to "Me", and e-mail 440e is sent from Spouse to "Me".

Meeting filter button 450 permits filtering of e-mail display 440 based on a meeting notice. Upon selection of meeting filter button 450, electronic communication user interface 400 can generate a filtering request to filtering component 332, which can then filter e-mails or other electronic communications based on an associated meeting request.

As part of a filtering request, e-mail group names used in an e-mail can be replaced with the one or more e-mail addresses in the e-mail group. For example, in filtering e-mail 440a from Abe T. to WHOMP, the WHOMP e-mail group reference can be replaced with e-mail addresses for Abe T., Babe O., Cabe Z., Lead R. and "Me". In some embodiments, calendar entries, contact information, e-mails, and/or other electronic communications can specify an e-mail group or other reference to a one or more e-mail recipients and/or meeting participants.

In other embodiments, electronic communication user interface 400 can be used to operate on other types of electronic communications other than e-mail, such as but not limited to meeting notices, contact information, and/or calendar entries. In these embodiments, meeting filter button 450 can be present while creating, reviewing, updating and/or deleting calendar entries, contact information, meeting notices, and/or other types of electronic communications In particular embodiments, selection of meeting filter button 450 can cause electronic communication user interface 400 change from displaying calendar entries, contact information, meeting notices, and/or other types of electronic communications to display e-mails matching the meeting filter.

Figure 5:
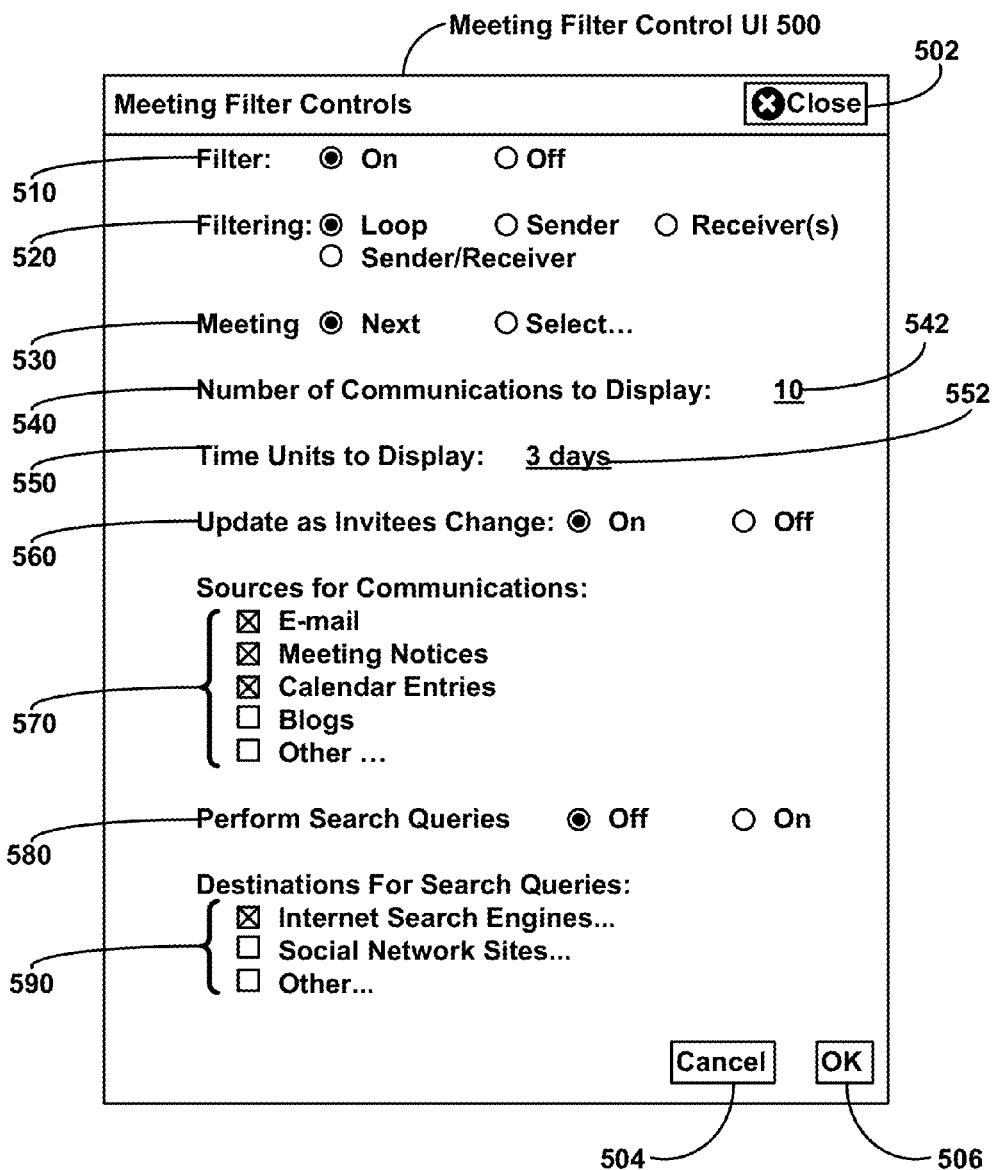
FIG. 5 is a screen view of a meeting filter control user interface, in accordance with an example embodiment.

FIG. 5 shows an example meeting filter control user interface (UI) 500, in accordance with an example embodiment. Meeting filter control user interface 500 can control operation of a meeting filter; for example, by using data stored in various selectors to format a filtering request to filtering component 332.

Meeting filter control user interface 500 includes controls 502, 504, and 506, filter-activation selector 510, filtering-type selector 520, meeting selector 530, communication-number selector 540, time-unit selector 550, invitee-update selector 560, communication-source selectors 570, search-query selector 580, and search-query-destination selectors 590. In other embodiments, meeting filter control user interface 500 can permit selection of more, fewer, and/or different selectors to control operation of a meeting filter.

Controls "Close" 502 and "Cancel" 504 each permit closing of meeting filter control user interface 500 without saving changes made to the selectors during a current session of using meeting filter control user interface 500. Control "OK" 506 can permit closing of meeting filter control user interface 500 while saving changes made to the selectors during the current session, perhaps after requesting confirmation to save any changes.

Filter-activation selector 510 permits selection of activation of the meeting filter by selecting the "On" button, or selection of deactivation of the meeting filter by selecting the "Off" button. In some embodiments, selecting meeting filter button 450 is equivalent to selecting the "On" button for filter-activation selector 510.

Filtering-type selector 520 permits selection of a filter to be used in filtering electronic communications. FIG. 5 shows four possible selections for filtering-type selector 520: a loop filter (shown as selected in FIG. 5), a sender filter, a receiver (s) filter, and a sender/receiver filter. Example operations of these types of filters are shown in FIG. 6.

FIG. 6 shows an example scenario 600 of filtering an example plurality of electronic communications 612 based on an example meeting 610 using a number of example filters, in accordance with an example embodiment. FIG. 6 shows that, for scenario 600, meeting 610 is scheduled for 1 PM Thursday, hosted by "A", with invitees "B", "C", and "D" and with a topic of "WHOMP Status Meeting." The agenda for meeting 610 is B, C, and D's status and the "Status Report" and "Action Items" documents are associated with the meeting.

FIG. 6 also shows example electronic communications 612 including communications 612a-612g are associated with scenario 600, as well. Table 1 below reproduces example communications 612a-612g:

TABLE 1

| | |
|---|---|
| 612a | From A: to B, C |
| 612b | From B: to A, D |
| 612c | From C: to A, B, D |
| 612d | From D: to E |
| 612e | From D: to A, B, C |
| 612e | From A: to A, B, D |
| 612f | From E: to A, D |

Sender filter 620 filters electronic communications to ensure the sender is a meeting participant. Example pseudo-code for sender filter 620 is shown in FIG. 6. The pseudo-code indicates that, for a given communication of a plurality of electronic communications: if the sender is a meeting participant, e.g., either the host or one of the invitees of the meeting, then the given communication is retained as a filtered communication; otherwise the given communication is discarded.

FIG. 6 shows an example plurality of sender-filtered communications 622 after filtering electronic communications 612 using the sender filter 620 based on meeting 610. As shown in FIG. 6, electronic communications 612a-612f are included in the plurality of sender-filtered communications 622. That is, sender filter 620 only filtered out electronic communication 612g of the example electronic communications 612, as the sender of electronic communication 612g is "E" and "E" is neither the host "A" nor an invitee "B", "C", or "D" of meeting 610. For all other communications 612a-612f, the sender is one of "A", "B", "C", or "D"; e.g., a meeting participant.

Receiver(s) filter 630 filters electronic communications to ensure that each of the receivers of a given communication is a meeting participant. Example pseudo-code for receiver(s) filter 630 is shown in FIG. 6. The pseudo-code indicates that, for a given communication of a plurality of electronic communications, if any of the receiver(s) of the given electronic communication is a meeting participant, then the given communication is retained as a filtered communication; otherwise the given communication is discarded.

In other embodiments, other filtering rules are possible for receiver(s) filter 630 as well. For one example, can use a filtering rule where: a given communication is retained as a filtered communication only if all of the receivers of the given electronic communication are meeting participants; otherwise, the given communication is discarded. As another example filtering rule, receiver(s) filter 630 can permit up to N non-participants, $N \geq 1$, to receive a given electronic communication before discarding the given electronic communication. Additional other filtering rules are possible as well.

FIG. 6 shows an example plurality of receiver(s)-filtered communications 632 after filtering electronic communications 612 using receiver(s) filter 630 based on meeting 610. As shown in FIG. 6, electronic communications 612a-612c and 612e-612g are included in the plurality of sender-filtered communications 622. That is, receiver(s) filter 630 only filtered out electronic communication 612d of the example electronic communications 612, as receiver "E" of electronic communication 612d is neither the host "A" or an invitee "B", "C", or "D" of meeting 610. For all other communications 612a-612c and 612e-612g, all of the receivers are one of "A", "B", "C", or "D".

Sender+receiver filter 640 filters electronic communications to ensure the sender and all of the receivers are either the host or an invitee of the meeting. Example pseudo-code for sender+receiver filter 640 is shown in FIG. 6. The pseudo-code for filter 640 indicates that, first sender filter 620 is applied, and then receiver(s) filter 630 is applied to the already-filtered plurality of communications.

FIG. 6 shows an example plurality of sender+receiver-filtered communications 642 after filtering electronic communications 612 using the sender+receiver filter 640 based on meeting 610. As shown in FIG. 6, electronic communications 612a-612c, 612e, and 612f are included in the plurality of sender-filtered communications 622. That is, sender+receiver filter 640 only filtered out electronic communications 612d and 612g, as the only communications in example plurality of electronic communications 612 that involve a non-participant of meeting 610 were electronic communications 612d and 612g.

Loop filter 650 filters electronic communications to ensure that the sender and all of the receivers of a given communication are the same as the meeting participants. Example pseudo-code for loop filter 650 is shown in FIG. 6. The pseudo-code indicates that, if the set including the sender and receivers of the given communication equals the set of meeting participants (i.e., the set including the host and all invitees of the meeting), then the given communication is retained as a filtered communication, but otherwise is discarded.

FIG. 6 shows an example plurality of loop-filtered communications 652 after filtering electronic communications 612 using the loop filter 650 based on meeting 610. As shown in FIG. 6, electronic communications 612c and 612d are included in the plurality of sender-filtered communications 622. That is, loop filter 650 filtered out electronic communications all electronic communications from example plurality of electronic communications 612 that did not include all of host "A", and invitees "B", "C", and "D" of meeting 610.

In some embodiments, "relaxed" loop filtering rules can be used. For example, a relaxed loop filtering rule permits up to N participants, $N \geq 1$, to be excluded from the set of the sender and all receivers of an electronic communication before discarding the electronic communication. As another example, a relaxed loop filtering rule can permit up to N, $N \geq 1$, additional entities than meeting participants to be part of the set of the sender and all receivers of an electronic communication before discarding the electronic communication. In still other embodiments, other filtering rules those described herein are possible as well.

Returning to FIG. 5, meeting selector 530 permits selection of a meeting for the meeting filter. The "Next" radio button permits selection of the next meeting, and selecting of the "Select . . . " radio button permits selection of specific meeting, perhaps by use of a pop-up, a dialog box, and/or another user interface component.

Selection of the "Next" radio button of meeting selector 520 would select the WHOMP meeting for use in filtering electronic communications, as the Thursday WHOMP meeting would be the next meeting after the current time of Wednesday. On the other hand, choosing the "Select . . . " radio button of meeting selector 520 can request electronic communication user interface 400 and/or meeting filter control user interface 500 to present a selector of a specific meeting (not shown), such as the Friday CHOMP meeting, the FlickFans Saturday movie meeting, or the Thursday WHOMP meeting.

Figure 7A:
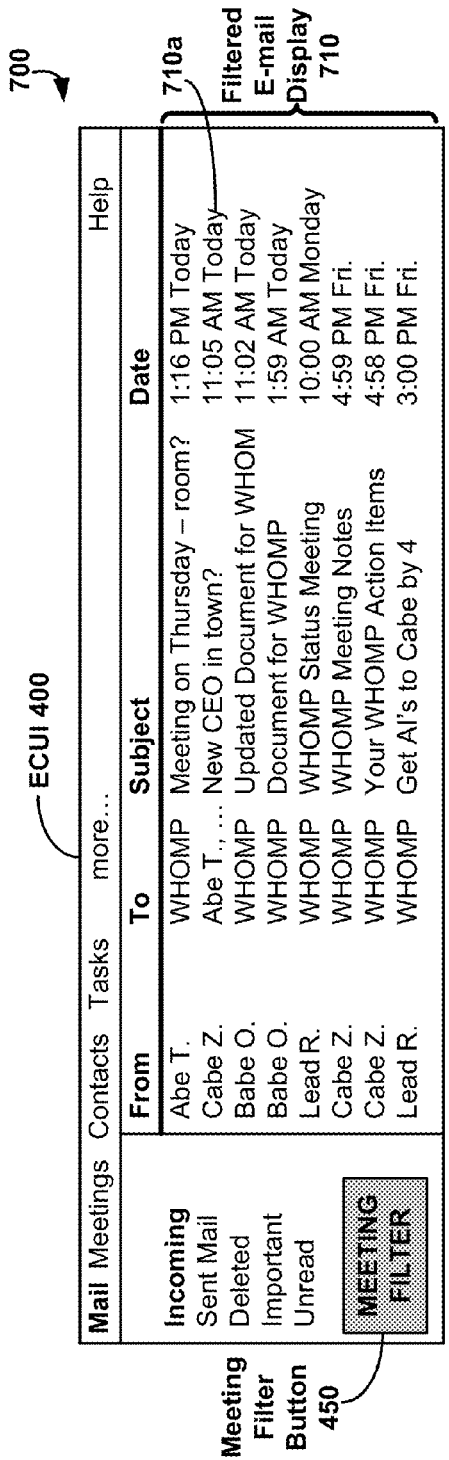
FIG. 7A illustrates an example scenario for utilizing a loop filter with a next meeting, in accordance with an example embodiment.

FIG. 7A shows an example scenario 700 for utilizing a loop filter with the next meeting, in accordance with an example embodiment. Scenarios 700 and 750 take place on a Wednesday where "Me" has three upcoming meetings: a WHOMP meeting on Thursday hosted by Lead R. and with invitees Abe T., Babe O., Cabe Z. and "Me" (e.g., the rest of the WHOMP group), a CHOMP meeting on Friday hosted by Eve L. with invitees Dave L., Faye L., and "Me" (e.g., the rest of the WHOMP group), and a FlickFans movie meeting on Saturday hosted by MovieMaven with invitees Doug R., Larry B., "Me", Pat B., and Spouse (e.g., the rest of the FlickFans group).

In scenario 700, the next meeting for "Me" is the WHOMP meeting. In scenario 700, "Me" has selected meeting filter button 450 to use a loop filter for filtering the electronic communications shown in e-mail display 440 of FIG. 4 for the next (WHOMP) meeting. FIG. 7A shows meeting filter button 450 with a gray background to indicate selection of button 450.

As described above, the loop filter will only retain messages sent by and addressed to the set of participants of the selected meeting as filtered communications. FIG. 7A shows filtered e-mail display 710 with electronic communications sent from Abe T., Babe O., Cabe Z., and Lead R. to the WHOMP group. Thus, the sender of each electronic communication of filtered e-mail display 710 is either the host, Lead R., or an invitee, Abe T., Babe O., or Cabe Z., of the next meeting. For each communication shown in filtered e-mail display 710, the other participants are addressed via the WHOMP group. For communication 710a, which is a communication from Cabe Z. to Abe T., Babe O., Lead R., and "Me" corresponding to communication 440b of FIG. 4, the WHOMP group is not used to specify the members of the group but all meeting invitees and the host either sent communication 710a or received communication 710a. Thus, for each filtered communication of filtered e-mail display 710, the set of the sender and all recipients for each of the filtered communications equals the set of participants of the WHOMP meeting.

Figure 7B:
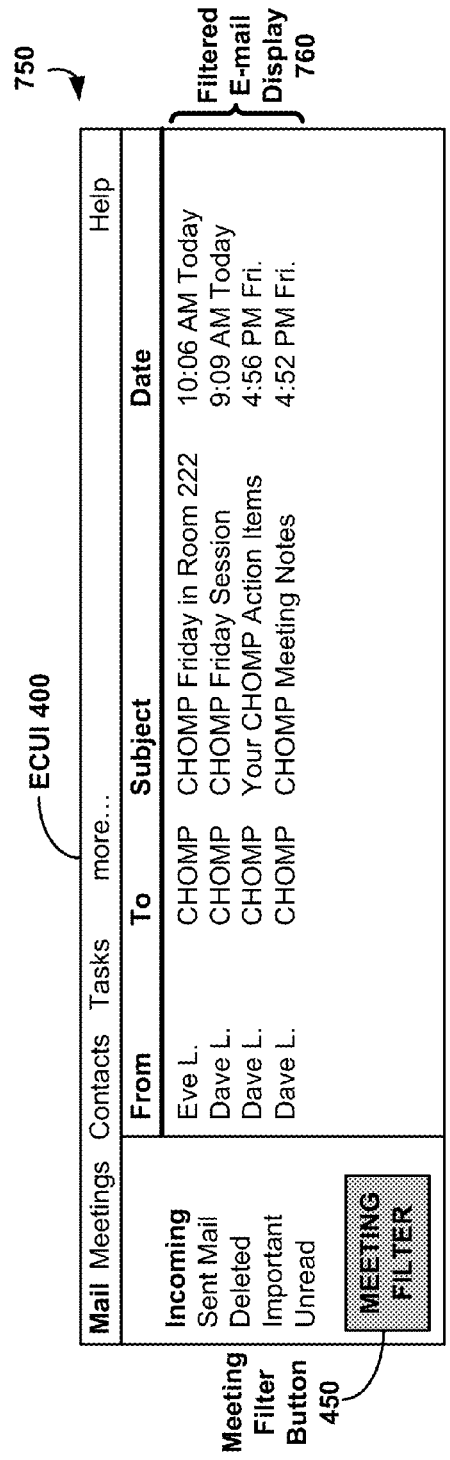
FIG. 7B illustrates an example scenario for utilizing a loop filter with a selected meeting, in accordance with an example embodiment.

FIG. 7B shows an example scenario 750 for utilizing a loop filter with a selected meeting, in accordance with an example embodiment. In scenario 750, "Me" has selected meeting filter button 450 to use a loop filter for filtering the electronic communications shown in e-mail display 440 of FIG. 4 for a selected meeting, and has selected the CHOMP meeting as a basis for filtering. FIG. 7B shows meeting filter button 450 with a gray background to indicate selection of button 450.

FIG. 7B shows filtered e-mail display 760 with electronic communications sent from Dave L. and Eve L. to the CHOMP group. Thus, the sender of each electronic communication of filtered e-mail display 710 is either the host, Eve L. or an invitee, Dave L. of the CHOMP meeting. The other invitees of the meeting and/or the host are addressed via the CHOMP group. In other scenarios not shown in FIG. 7B, the CHOMP group is not used to specify the members of the group; e.g., an e-mail from Faye L. sent using the e-mail addresses of Dave L., Eve L., and "Me" instead of being addressed to the CHOMP group. Thus, for each filtered communication of filtered e-mail display 710, the set of the sender and all recipients the filtered communications equals the set of the host and all invitees of the CHOMP meeting.

Returning to FIG. 5, communication-number selector 540 provides for specification of a number of communications 542 that match the meeting filter to be displayed. FIG. 5 shows that number of communications 542 is 10, so that up to 10 communications that match the meeting filter would be displayed; e.g., via electronic communications user interface 400. In some embodiments, if number of communications 542 is unspecified via meeting filter control user interface 500, all communications that match the meeting filter to be displayed and fit into electronic communications user interface 400 would be displayed.

Time-unit selector 550 permits selection of a maximum number of time units 552 for communications to match the meeting filter. For example, FIG. 5 shows number of time units 552 as 3 days, so that only communications less than or equal to 3 days old that match the meeting filter would be displayed. In some embodiments, if number of time units 552 is unspecified, all communications that match the meeting filter to be displayed and fit into electronic communications user interface 400 would be displayed. In other embodiments, the time units can be specified in terms other than days; e.g., minutes, hours, weeks, years, etc.

Invitee-update selector 560 permits updating a display plurality of communications as invitees change. For example, suppose a meeting of a CHOMP sub-group included Dave L. and Eve L., and that later "Me" was added to the meeting of the CHOMP sub-group. Further suppose that Dave L. had a meeting filter for a meeting of the CHOMP sub-group active while "Me" was added to the meeting. Then, Dave L.'s filtered plurality of communications would then include communications to and from "Me" after "Me" was added if Dave L.'s invitee-update selector 560 were set to "On" and would not include communications to and from "Me" if Dave L.'s invitee-update selector 560 were set to "Off."

Communication-source selectors 570 permit selection of various communication sources as inputs to filtering component 332. FIG. 5 shows that e-mail and meeting notices are selected as input sources, while blogs and other inputs are not selected. That is, based on the selection shown in FIG. 5, a filtered plurality of electronic communications will consist of e-mails, meeting notices, and calendar entries, as filtering component 332 will exclude any blog entries and other electronic communications from the filtered plurality. In some embodiments, meeting notices can be implemented as e-mails and/or calendar.

Search-query selector 580 permits, when set to "On", permits the optional automated performance of search queries related to filtered communications. When search-query selector 580 is set to "Off", such as shown in FIG. 5, search queries will not automatically be performed on filtered communications.

Search-query-destination selectors 590 permit selection of various destinations for automated search queries, if automated search queries are were selected via search-query selector 580. FIG. 5 shows that Internet searches engines, social network sites, and other sources are possible destinations for automated search queries, but only Internet search engines are selected. In some embodiments, selection of a search-query-destination selector 590 can force search-query selector 580 to be "On"; while in other embodiments, selection of search-query selector 580 to be "Off" indicates that search-query-destination selector 590 is to be ignored.

Many other possible selectors and options other than shown in FIG. 5 are possible as well.

Figure 8:
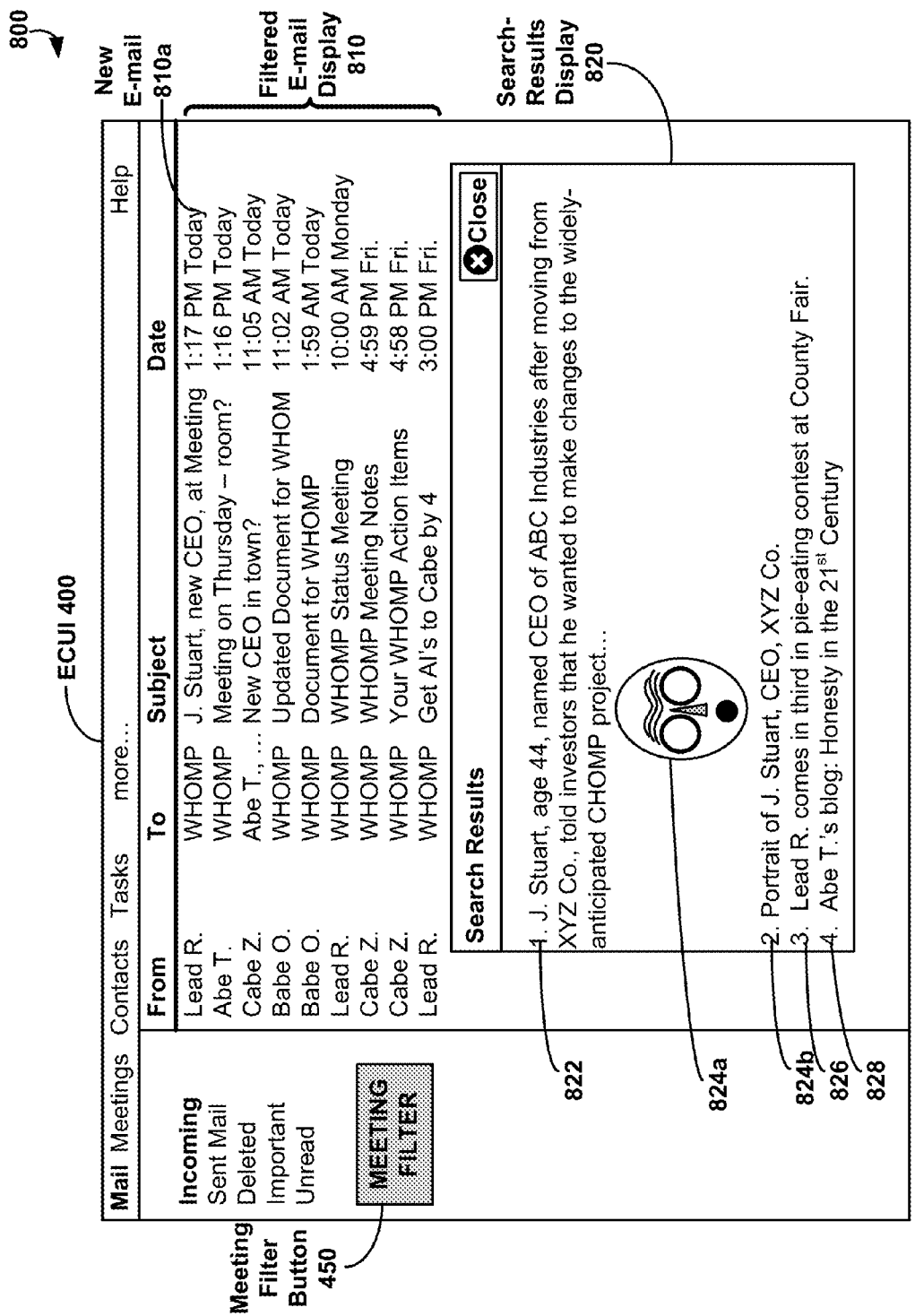
FIG. 8 illustrates an example scenario in which a loop filter is applied to a plurality of communications based on a meeting and corresponding search results are displayed, in accordance with an example embodiment.

FIG. 8 shows an example scenario 800 where a loop filter is applied to a plurality of communications based on a meeting and corresponding automated search results are displayed, in accordance with an example embodiment. Scenario 800 continues scenario 700, where "Me" has received new e-mail 810*a* shown in filtered e-mail display 810.

FIG. 8 shows that new e-mail 810*a* is from Lead R. and has a subject of "J. Stuart, new CEO, at Meeting." Scenario 800 continues with "Me" requesting automated search results for filtered e-mail display 810. As an example, "Me" can use meeting filter control user interface 500 to change search-query selector 590 from "Off", as shown in FIG. 5, to "On" and thereby request automated search results. In other embodiments, a button similar to meeting filter button 450 or other user-interface control, can be used to request and/or inhibit requesting of search results.

FIG. 8 shows that, in response to requesting the search results in scenario 800, electronic communications user interface 400 has automatically generated and displayed search-results display 820 with search results 822, 824*a*, 824*b*, 826, and 828.

Keywords and/or other terms for search queries can be derived from an electronic meeting notice and/or one or more of the electronic communications in a filtered plurality of communications, such as the e-mails shown in filtered e-mail display 810. In scenario 800, search keyword(s) can be derived from the terms "J. Stuart" and/or "CEO" in the subject line of new e-mail 810*a*. Other terms for search queries can include names and/or e-mail addresses of the WHOMP group members and or other words used in the electronic meeting notice and/or one or more of the filtered electronic communications. For example, text of the electronic meeting notice and/or electronic communications can be compared to one or more common words, and any words that do not match the one or more common words can be used as keywords and/or other terms for search queries. Other techniques to derive keywords and/or other terms for search queries are possible as well.

Search queries using the derived keywords and/or other terms for search queries can be formatted and provided to the destination(s) for search queries selected using search-query-destination selectors 590. As shown in FIG. 8, the terms "J. Stuart" and/or "CEO" can lead to search results 822, 824*a*, and 824*b* related to "J. Stuart" who is a "CEO" and other terms can lead to search result 826 about Lead R.'s showing in a pie-eating contest and search result 828 of Abe T.'s blog entry.

FIG. 8 shows textual search results 822, 824*b*, 826, and 828 and an image search result 824*a*. In other scenarios, additional types of information, such as, but not limited to video, audio, audio-video, and/or binary information, can be included in search results shown in search-results display 820.

Example Operation

Figure 9:
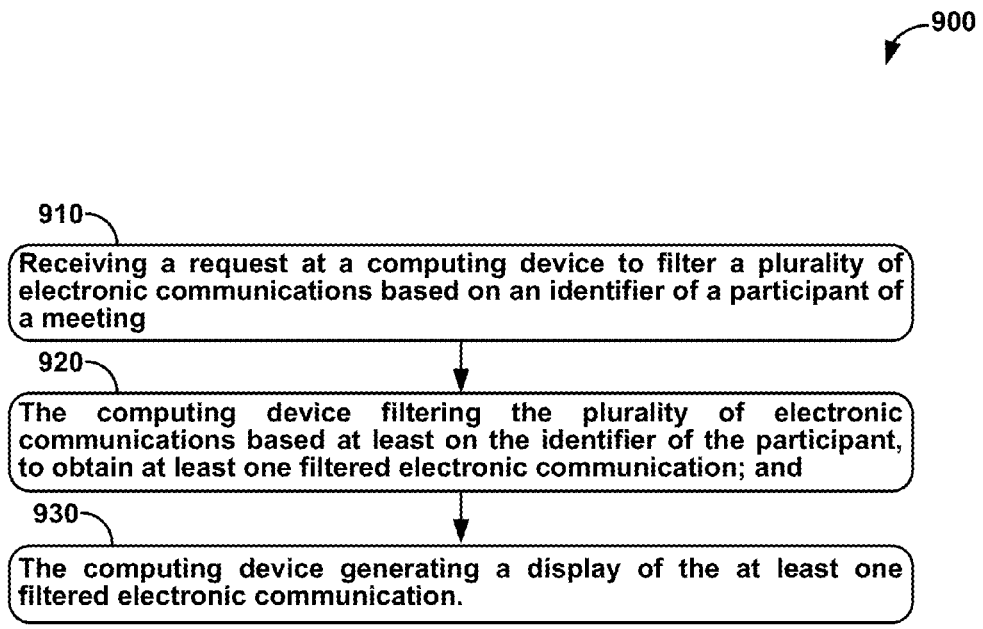
FIG. 9 is a flow chart of a method in accordance with an example embodiment.

FIG. 9 is a flow chart of an example method 900 in accordance with an example embodiment. At block 910 a request to filter a plurality of electronic communications based on an identifier of a participant of a meeting is received at a computing device. Receiving requests to filter pluralities of electronic communications based on identifiers of meeting participants is described above with reference to at least FIGS. 3-8.

In some embodiments, the plurality of electronic communications can include one or more e-mails, blog posts, social-networking messages, electronic meeting notices, instant messages, short message service (SMS) messages, web pages, and/or other messages related to one or more participants of the meeting, and combinations thereof. The other messages can include, but are not limited to, notifications regarding one or more web pages, bug reports, bug fix reports, trouble tickets, status reports, task origination messages, task update messages, task completion messages, and combinations thereof.

At block 920, the plurality of electronic communications are filtered by the computing device, based at least on the identifier of the participant, to obtain at least one filtered electronic communication. Filtering pluralities of electronic communications based on identifiers of invitees of meetings to obtain filtered electronic communications is described above with reference to at least FIGS. 3-8.

In some embodiments, the plurality of electronic communications can include an electronic meeting notice that can include the identifier of the participant. In these embodiments, filtering the plurality of electronic communications based at least on the identifier of the participant can include: (a) retrieving the identifier of the participant from the electronic meeting notice and (b) filtering the plurality of electronic communications based at least on the retrieved identifier of the participant. Filtering electronic communications based on electronic meeting notices that include identifiers of the participants is described above with reference to at least FIGS. 4-8.

In particular embodiments, the electronic meeting notice can further include a plurality of participant identifiers, which in turn can include the retrieved identifier of the participant, such as described above with reference to at least FIGS. 4-8. In these embodiments, filtering the plurality of electronic communications based at least on the retrieved identifier of the participant can include filtering the plurality of electronic communications based at least on the plurality of participant identifiers, such as described above with reference to at least FIGS. 4-8.

In some of the particular embodiments, filtering the plurality of electronic communications based at least on the plurality of participant identifiers can include: (a) receiving a first electronic communication of the plurality of electronic communications, (b) determining whether a sender identifier of a sender of the first electronic communication corresponds to a participant identifier of the plurality of participant identifiers, (c) responsive to determining that the sender identifier does not correspond to any participant identifier of the plurality of participant identifiers, identifying the first electronic communication as not being a filtered electronic communication, (d) responsive to determining that the sender identifier does correspond to the participant identifier, identifying the first electronic communication as being a filtered electronic communication, such as described above with reference to at least FIG. 6.

In other embodiments of the some of the particular embodiments, where in response to identifying the first electronic communication being a filtered electronic communication, method 900 can include: (a) determining whether a receiver identifier of any receiver of the first electronic communication corresponds to a participant identifier of the plurality of participant identifiers, (b) responsive to determining that the receiver identifier does not correspond to any participant identifier of the plurality of participant identifiers, changing an identification of the first electronic communication to not being a filtered electronic communication, and (c)

responsive to determining that the receiver identifier corresponds to the participant identifier of the plurality of participant identifiers, re-identifying the first electronic communication as being a filtered electronic communication, such as described above with reference to at least FIG. 6.

In other embodiments, filtering the plurality of electronic communications based on the plurality of participant identifiers can include: (a) receiving a first electronic communication of the plurality of electronic communications, (b) determining whether a receiver identifier for any receiver of the first electronic communication corresponds to a participant identifier of the plurality of participant identifiers, (c) responsive to determining that the receiver identifier does not correspond to any participant identifier of the plurality of participant identifiers, identifying the first electronic communication as not being a filtered electronic communication, and (d) responsive to determining that the receiver identifier corresponds to the participant identifier of the plurality of participant identifiers, identifying the first electronic communication as being a filtered electronic communication, such as described above with reference to at least FIG. 6.

In still other of the particular embodiments, filtering the plurality of electronic communications based at least on the plurality of participant identifiers can include: (a) receiving a first electronic communication of the plurality of electronic communications, (b) defining a set of communication-based identifiers consisting of: (i) an identifier of a sender of the first electronic communication of the plurality of electronic communications, and (ii) one or more identifiers of receivers of the first electronic communication of the plurality of electronic communications; (c) defining a set of meeting-based identifiers consisting of the plurality of participant identifiers, (d) responsive to determining that the set of communication-based identifiers does not equal the set of meeting-based identifiers, identifying the first electronic communication as not being a filtered electronic communication, and (e) responsive to determining that the set of communication-based identifiers equals the set of meeting-based identifiers, identifying the first electronic communication as being a filtered electronic communication, such as described above with reference to at least FIG. 6.

In additional other embodiments, filtering the plurality of electronic communications, based at least on the identifier of the participant, to obtain at least one filtered electronic communication can include filtering the plurality of electronic communications based on a keyword derived from one or more electronic communications in the plurality of electronic communications, such as discussed above at least in the context of FIG. 8.

At block 930, the computing device can generate a display of the at least one filtered electronic communication. Generating displays of filtered electronic communications is described above with reference to at least FIGS. 4-8.

In some embodiments, the display of the at least one filtered electronic communication includes no more than N electronic communications of the filtered plurality of electronic communications, wherein N is an integer greater than 0, such as described above with reference to at least FIG. 5.

In other embodiments, the display of the at least one filtered electronic communication includes only electronic communications of the filtered plurality of electronic communications that are no more than N units of time old, wherein N is an integer greater than 0, such as described above with reference to at least FIG. 5. In particular of these other embodiments, the units of time are days.

In still other embodiments, the plurality of electronic communications can include an electronic meeting notice, and method 900 can further include updating the electronic meeting notice to include an additional participant, and where generating the display of the at least one filtered electronic communication can include updating the display of the at least one filtered electronic communication based on the additional participant, such as described above with reference to at least FIG. 5.

In even other embodiments, generating the display of the at least one filtered electronic communication can include generating a display of information other than the at least one electronic communication related to the participant of the meeting, such as described above with reference to at least FIGS. 5 and 8. In some of these even other embodiments, the information other than the at least one electronic communication related to the participant of the meeting can include a search result related to the participant of the meeting, such as described above with reference to at least FIGS. 5 and 8. In particular of these even other embodiments, the search result can include information from a social network site.

In some embodiments of method 900, method 900 can also include: obtaining an identifier of a non-participant of the meeting, and where wherein filtering the plurality of electronic communications comprises filtering the plurality of electronic communications based at least on the identifier of the non-participant using the computing device, such as described above in the context of at least FIG. 8.

In other embodiments of method 900, method 900 can also include: displaying the generated display of the at least one filtered electronic communication, such as described above in the context of at least FIGS. 4-8.

CONCLUSION

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as described herein, each block and/or communication can represent a processing of information and/or a transmission of information in accordance with example embodiments. Alternative embodiments are included within the scope of these example embodiments. In these alternative embodiments, for example, functions described as blocks, transmissions, communications, requests, responses, and/or messages can be executed out of order from that shown or described, including substantially concurrent or in reverse order, depending on the functionality involved. Further, more or fewer blocks and/or functions can be used with any of the ladder diagrams, scenarios, and flow charts described herein, and these ladder diagrams, scenarios, and flow charts can be combined with one another, in part or in whole.

A block that represents a processing of information can correspond to circuitry that can be configured to perform the specific logical functions of a herein-described method or technique. Alternatively or additionally, a block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk or hard drive or other storage medium.

The computer readable medium can also include non-transitory computer readable media such as computer-readable media that stores data for short periods of time like register memory, processor cache, and random access memory (RAM). The computer readable media can also include non-transitory computer readable media that stores program code and/or data for longer periods of time, such as secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a block that represents one or more information transmissions can correspond to information transmissions between software and/or hardware modules in the same physical device. However, other information transmissions can be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
   receiving, via an electronic meeting notice that comprises a plurality of participant identifiers associated with a meeting, a request at a computing device to filter a plurality of electronic communications based on a first participant identifier of the plurality of participant identifiers associated with the meeting, wherein the plurality of electronic communications comprise the electronic meeting notice;
   the computing device filtering the plurality of electronic communications, based at least on the first participant identifier, to obtain at least one filtered electronic communication, wherein filtering the plurality of electronic communications based at least on the first participant identifier comprises:
      receiving a first electronic communication of the plurality of electronic communications,
      determining whether a sender identifier of a sender of the first electronic communication corresponds to a participant identifier of the plurality of participant identifiers, and
      responsive to determining that the sender identifier does not correspond to any participant identifier of the plurality of participant identifiers, identifying the first electronic communication as not being a filtered electronic communication; and
   the computing device generating a display of the at least one filtered electronic communication.

2. The method of claim 1, wherein the plurality of electronic communications comprise one or more e-mails, blog posts, social-networking messages, electronic meeting notices, instant messages, short message service (SMS) messages, web pages, other messages related to one or more participants of the meeting, and combinations thereof,
   wherein the other messages comprise notifications regarding one or more web pages, bug reports, bug fix reports, trouble tickets, status reports, task origination messages, task update messages, task completion messages, and combinations thereof.

3. The method of claim 1, wherein filtering the plurality of electronic communications further comprises:
   responsive to determining that a sender identifier of a sender of a second electronic communication does correspond to the participant identifier, identifying the second electronic communication as being a filtered electronic communication.

4. The method of claim 1, wherein filtering the plurality of electronic communications further comprises:
   determining whether a receiver identifier for any receiver of a second electronic communication corresponds to a participant identifier of the plurality of participant identifiers;
   responsive to determining that the receiver identifier does not correspond to any participant identifier of the plurality of participant identifiers, identifying the second electronic communication as not being a filtered electronic communication; and
   responsive to determining that the receiver identifier corresponds to the participant identifier of the plurality of participant identifiers, identifying the second electronic communication as being a filtered electronic communication.

5. The method of claim 1, wherein filtering the plurality of electronic communications further comprises:
   defining a set of communication-based identifiers consisting of:
      an identifier of a sender of a second electronic communication of the plurality of electronic communications, and
      one or more identifiers of receivers of the second electronic communication of the plurality of electronic communications;
   defining a set of meeting-based identifiers consisting of the plurality of participant identifiers;
   determining whether the set of communication-based identifiers equals the set of meeting-based identifiers;
   responsive to determining that the set of communication-based identifiers does not equal the set of meeting-based identifiers, identifying the second electronic communication as not being a filtered electronic communication; and
   responsive to determining that the set of communication-based identifiers equals the set of meeting-based identifiers, identifying the second electronic communication as being a filtered electronic communication.

6. The method of claim 3, wherein filtering the plurality of electronic communications further comprises:
   in response to identifying the second electronic communication as being a filtered electronic communication:
   determining whether a receiver identifier of any receiver of the second electronic communication corresponds to a participant identifier of the plurality of participant identifiers;
   responsive to determining that the receiver identifier does not correspond to any participant identifier of the plurality of participant identifiers, changing an identification of the second electronic communication to not being a filtered electronic communication; and responsive to determining that the receiver identifier corresponds to the participant identifier of the plurality of participant identifiers, re-identifying the second electronic communication as being a filtered electronic communication.

7. The method of claim 1, further comprising:
updating the electronic meeting notice to include an additional participant; and
wherein generating the display of the at least one filtered electronic communication comprises updating the display of the at least one filtered electronic communication based on the additional participant.

8. The method of claim 1, wherein the display of the at least one filtered electronic communication comprises no more than N electronic communications of the filtered plurality of electronic communications, wherein N is an integer greater than 0.

9. The method of claim 1, wherein the display of the at least one electronic communication includes only electronic communications of the filtered plurality of electronic communications that are no more than N units of time old, wherein N is an integer greater than 0.

10. The method of claim 1, wherein filtering the plurality of electronic communications further comprises filtering the plurality of electronic communications based on a keyword derived from one or more electronic communications in the plurality of electronic communications.

11. The method of claim 1, further comprising:
obtaining an identifier of a non-participant of the meeting; and
wherein filtering the plurality of electronic communications further comprises filtering the plurality of electronic communications, using the computing device, based at least on the identifier of the non-participant.

12. The method of claim 1, wherein generating the display of the at least one filtered electronic communication comprises generating a display of information other than the at least one electronic communication related to the participant of the meeting.

13. The method of claim 12, wherein the information other than the at least one electronic communication related to the participant of the meeting comprises a search result related to the participant of the meeting.

14. The method of claim 13, wherein the search result comprises information from a social network site.

15. The method of claim 1, further comprising:
displaying the generated display of the at least one filtered electronic communication.

16. A computing device, comprising: a processor;
memory having one or more instructions that, upon execution by the processor, cause the computing device to perform functions comprising:
receiving, via an electronic meeting notice that comprises a plurality of participant identifiers associated with a meeting, a request to filter a plurality of electronic communications based on a first participant identifier of the plurality of participant identifiers associated with the meeting, wherein the plurality of electronic communications comprise the electronic meeting notice;
filtering the plurality of electronic communications based at least on the first participant identifier to obtain at least one filtered electronic communication wherein filtering the plurality of electronic communications based at least on the first participant identifier comprises:
receiving a first electronic communication of the plurality of electronic communications, determining whether a sender identifier of a sender of the first electronic communication corresponds to a participant identifier of the plurality of participant identifiers, and responsive to determining that the sender identifier does not correspond to any participant identifier of the plurality of participant identifiers, identifying the first electronic communication as not being a filtered electronic communication; and
generating a display of the at least one filtered electronic communication.

17. The computing device of claim 16, further comprising a user interface module, and
wherein the functions further comprise: displaying the generated display of the at least one filtered electronic communication using the user interface module.

18. An article of manufacture including a non-transitory computer-readable storage medium having instructions stored thereon that, in response to execution by a processor, cause the processor to perform functions, the instructions comprising:
instructions to receive, via an electronic meeting notice that comprises a plurality of participant identifiers associated with a meeting, a request to filter a plurality of electronic communications based on a first participant identifier of the plurality of participant identifiers associated with the meeting, wherein the plurality of electronic communications comprise the electronic meeting notice;
instructions to filter the plurality of electronic communications based at least on the first participant identifier to obtain at least one filtered electronic communication, wherein the instructions to filter the plurality of electronic communications based at least on the first participant identifier comprise:
instructions to receive a first electronic communication of the plurality of electronic communications,
instructions to determine whether a sender identifier of a sender of the first electronic communication corresponds to a participant identifier of the plurality of participant identifiers, and
instructions to, responsive to determining that the sender identifier does not correspond to any participant identifier of the plurality of participant identifiers, identify the first electronic communication as not being a filtered electronic communication; and instructions to generate a display of the at least one filtered electronic communication.

* * * * *